June 7, 1949.  T. G. SCHMEISER  2,472,386
SOIL PULVERIZING AND ROLLING IMPLEMENT
Filed May 8, 1944  3 Sheets-Sheet 1
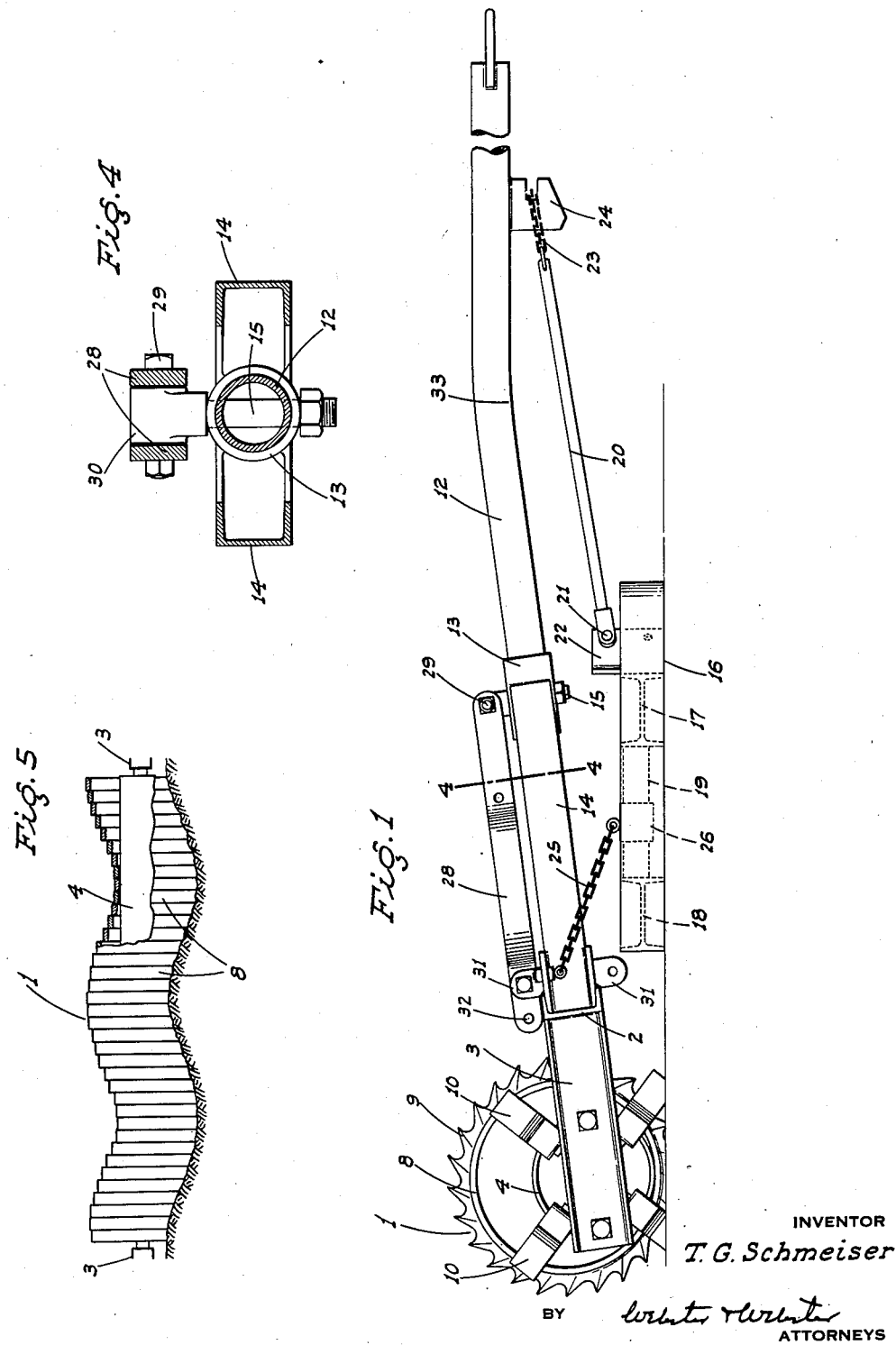
INVENTOR
T. G. Schmeiser
BY
ATTORNEYS

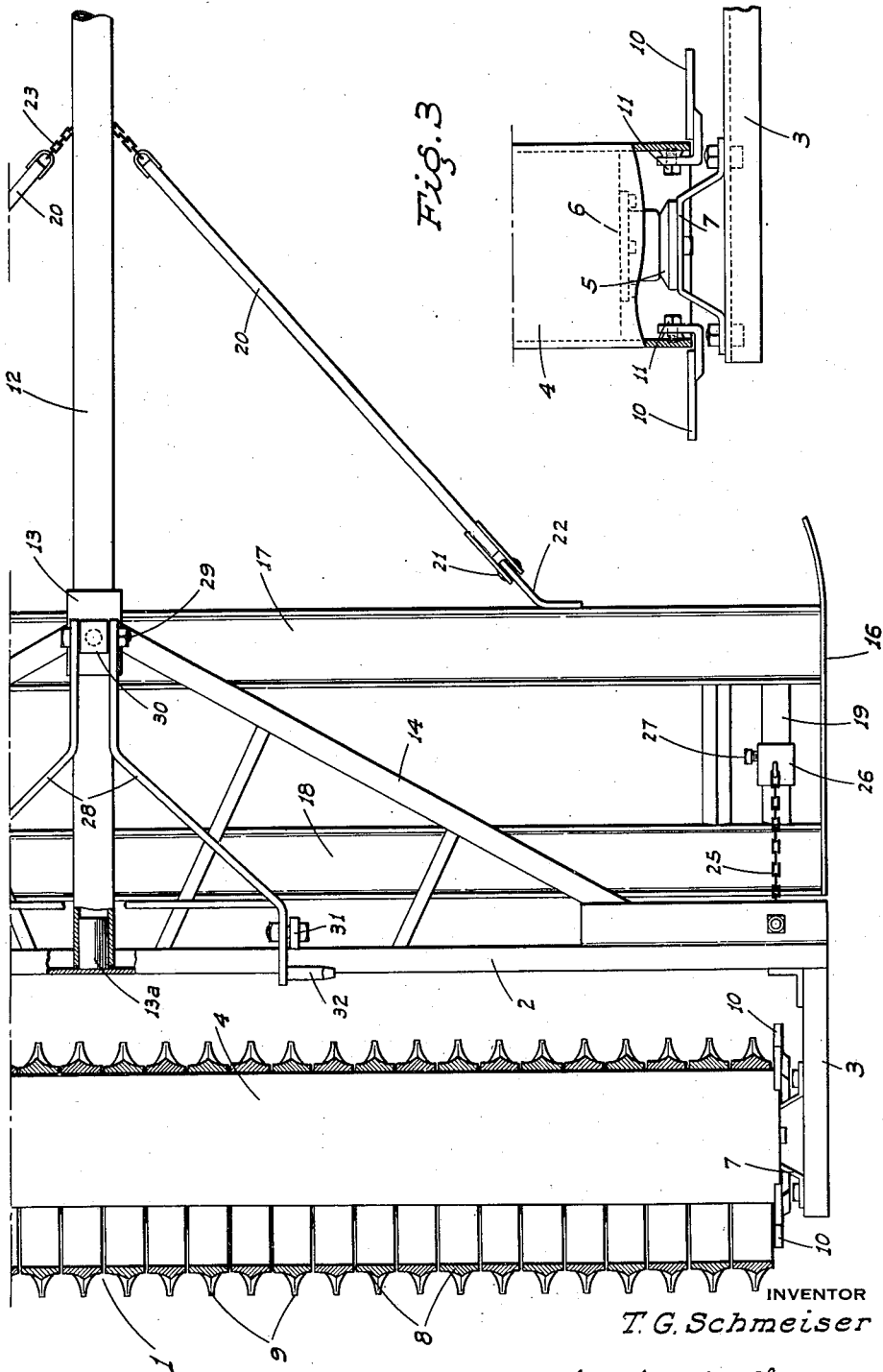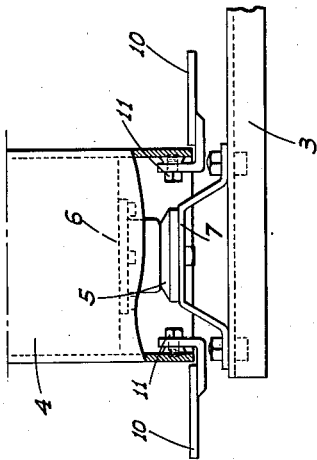

June 7, 1949.　　　T. G. SCHMEISER　　　2,472,386
SOIL PULVERIZING AND ROLLING IMPLEMENT Filed May 8, 1944　　　3 Sheets-Sheet 3

INVENTOR
T. G. Schmeiser
BY
ATTORNEYS

Patented June 7, 1949

2,472,386

UNITED STATES PATENT OFFICE 2,472,386

SOIL PULVERIZING AND ROLLING IMPLEMENT

Theodore G. Schmeiser, Fresno, Calif.

Application May 8, 1944, Serial No. 534,570

1 Claim. (Cl. 55—77)

This invention is directed to, and it is an object to provide, improvements in a soil working implement, of the type shown in my U. S. Patent No. 2,288,110, which includes a toothed roller unit operative to pulverize and pack the top soil in the preparation or maintenance of a seed bed.

Another object of this invention is to provide a toothed roller unit which comprises an elongated, frame supported draft cylinder disposed transversely of the direction of travel, and a plurality of soil pulverizing and compacting rings surrounding said draft cylinder in end to end relation; said rings having an internal diameter substantially greater than the external diameter of the draft cylinder whereby with advance of the implement the individual rings may separately float on the ground so that the roller unit conforms to ground contour and accomplishes more effective working of the soil.

A further object of this invention is to provide a toothed roller unit, as above, which is arranged for connection, selectively, in conventional draft or trailing relation by a tongue to the tractor, or—with the tongue removed—connected in unitary relation onto the combination draft and lift link unit of a tractor such as the Ford-Ferguson whereby the roller unit can be lifted clear of the ground when desired, or its working depth controlled.

An additional object of the invention is to provide a novel connecting assembly for the drag which is included in the implement when the latter is coupled by the tongue to the tractor; said connecting assembly being constructed to permit of adjustment of the angle of the drag transversely of the direction of travel.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a side elevation of the implement connected by the tongue to a tractor.

Figure 2 is a fragmentary plan view of the implement with the roller unit mainly in section.

Figure 3 is a fragmentary plan view, partially broken away, showing one end of the roller unit and the corresponding bearing assembly.

Figure 4 is a cross section, enlarged, on line 4—4 of Fig. 1.

Figure 5 is a diagrammatic rear end view, partly in section, of the roller unit when the implement is coupled to a tractor, as shown in Fig. 1.

Figure 6:
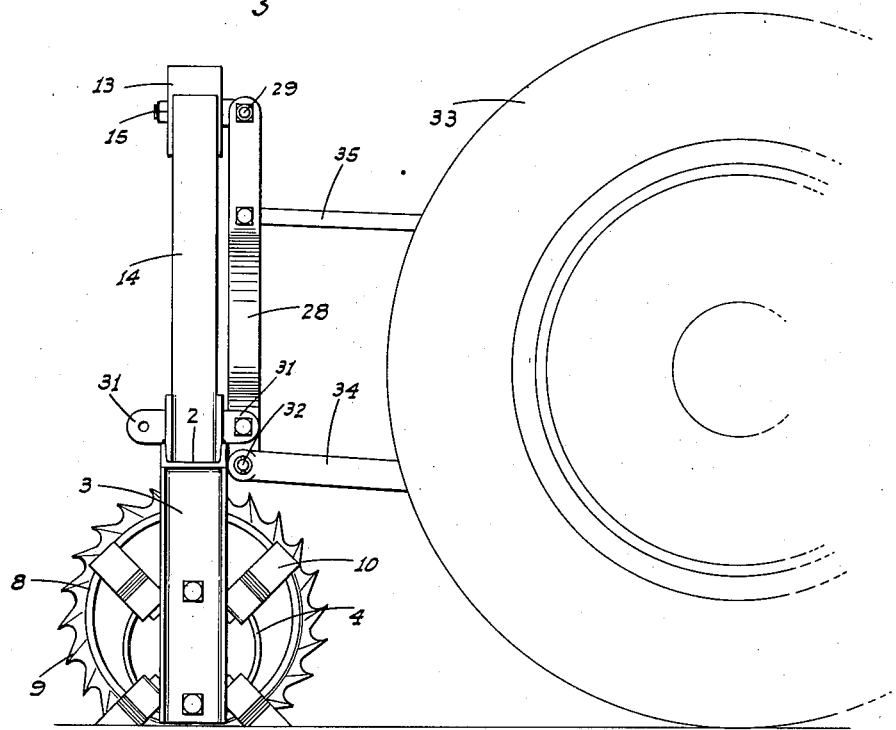
Figure 6 is an end view of the roller unit as connected in unitary relation with the draft and lifting link unit of a tractor.

Referring now more particularly to the characters of reference on the drawings, the implement comprises a soil pulverizing and rolling unit, indicated generally at 1, which extends transversely of the direction of travel and includes a frame having a transverse forward beam 2 and parallel rearwardly extending end beams 3. A draft cylinder 4 extends between the end beams 3, and at each end said cylinder is connected with the corresponding beam by means of a bearing unit 5 which is fixed between a head 6 in the draft cylinder 4 and a bracket 7 on said beam. As shown, the ends of the draft cylinder 4 run relatively close to the end beams 3.

The draft cylinder 4 is surrounded from end to end by a plurality of soil pulverizing and packing rings 8 which include a circumferential row of outwardly projecting cultivator teeth 9; such rings being shown in detail in my U. S. Design Patent No. 137,446. The rings 8 have an internal diameter which is substantially greater than the external diameter of the draft cylinder 4, whereby with advance of the implement the individual rings separately and independently float on the ground whereby the roller unit, from end to end thereof, conforms to the ground contour, as illustrated in Fig. 5, and consequently produces a more effective working of the soil. The rings 8 are held against escape from the ends of the draft cylinder 4 by means of a plurality of circumferentially spaced radially extending fingers 10 which are fixed on said cylinder by attaching means, indicated generally at 11. In order to prevent any possible binding between adjacent rings on the draft cylinder 4, said rings have a considerable amount of loose play between each other lengthwise of said cylinder.

The implement includes a forwardly extending draft tongue 12 which removably engages, intermediate its ends, in a forwardly projecting sleeve 13 fixed ahead of the front beam 2 of the frame of the roller unit, centrally of the ends of the latter; said sleeve being maintained rigid by suitable diagonal bracing 14 which forms the main draft yoke. At its rear end the tongue, which is hollow, removably fits over a lug 13a projecting forwardly from beam 2. Withdrawal of the tongue 12 from the sleeve 13 and lug 13a is normally prevented by means of a removable cross bolt 15 through sleeve 13 and the tongue.

When the roller unit 1 is connected with a tractor in trailing relation by means of the tongue 12, such implement may include a rectangular drag, indicated generally at 16, which is elongated transversely of the direction of travel and of substantially the same length as the roller unit 1, ahead of which said drag is disposed. The drag includes a front beam 17 and a rear beam 18 rigidly secured together in spaced parallel relation by means including rigid tubular members 19 disposed in an exposed position adjacent the ends of the drag.

The drag 16 is connected to the tongue 12 by means of a pair of forwardly converging draft links 20 pivotally connected at their rear ends, as at 21, with ears 22 fixed on the front beam 17 of the drag intermediate its ends and the longitudinal center line thereof. At their forward ends the converging links 20 terminate short of each other and said ends are connected by a link chain 23 which engages in a forwardly notched ear 24 fixed on and depending from said tongue; the notch in the ear being of limited height whereby when the chain 23 is engaged therein at any selected point, the chain cannot slip lengthwise.

Other chains 25 are connected to the front beam 2 of the roller unit frame adjacent the ends of the latter and thence extend forwardly to connection with collars 26 on tubular members 19; said collars being slidably adjustable along said members but normally held in fixed position by a set screw 27. It will be seen that when the chain 23 is secured in any given position of adjustment in connection with the ear 24, the collars 26 are then adjusted longitudinally of the tubular members 19 until the chains 25 are relatively taut. By reason of the above arrangement the working angle of the drag 17 may be effectively controlled.

Figure 7:
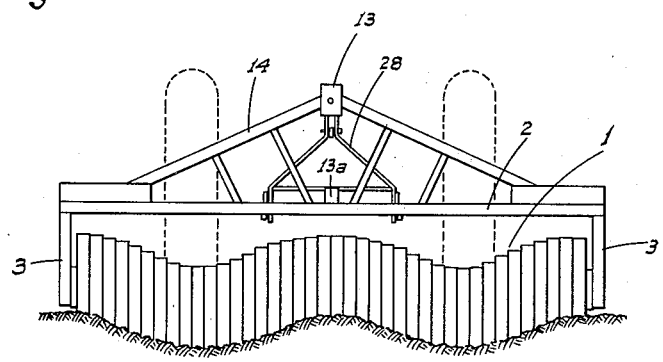
Figure 7 is a diagrammatic view of the roller unit when coupled to a tractor, as shown in Fig. 6.

When it is desired to use the roller unit 1 on a tractor, such as the Ford-Ferguson type, in the manner shown in Figs. 6 and 7, the tongue 12 is removed from the sleeve 13 and the chains 25 are detached from the roller unit frame so that the drag 16 may likewise be disconnected from the implement.

The sleeve 13 and front beam 2 of the roller unit 1 normally fixedly support, in parallel relation to said sleeve, an A frame or V strut 28 which forms an auxiliary draft yoke which is connected, by means of a cross bolt 29 at its forward end, to a head 30 on one end of the bolt 15, which is replaced in sleeve 13 after removal of the tongue 12. At the other or rear end the strut 28 is attached to ears 31 which upstand from beam 2 of the roller unit frame, and at such end the strut includes fixed attachment pins 32 on the legs thereof.

As shown in Fig. 6, the tractor, indicated generally at 33, includes a power actuated draft and lift link unit which has a pair of transversely spaced, rearwardly projecting bottom links 34 and a rearwardly projecting top link 35. After the roller unit 1 has been disconnected from the tongue 12 and drag 16, as previously explained, the sleeve 13 is swung to a vertical position, which likewise positions the strut. With the V strut 28 in vertical position the links 34 and 35 are connected to corresponding points thereon, as clearly shown in Fig. 6.

With the roller unit thus mounted, it may be lowered to ride the ground in conforming relation thereto, as shown in Fig. 7, or it can be lifted clear of the ground when making turns or for transport. Also, this Ford-Ferguson system enables the working depth of the cultivator rings to be altered as may be desired.

It will be noted that when the tractor links 34 and 35 are connected to the V strut when the latter is in its normal position on top of the frame beam 2, the ring teeth will be facing in the opposite direction to that shown in Fig. 1. If it is desired that the teeth shall face in the same direction as in Fig. 1, the V-strut is removed from its top position and inverted or replaced under beam 2; ears 31 being provided in corresponding position for this purpose, as shown in Figs. 1 and 6.

It will also be noted that the tongue 12 is formed with a downward bend intermediate its ends, as at 33. This provides a greater clearance at the cross beam 2 and adjacent points than would otherwise be obtained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

An earth working roller unit comprising a frame which includes a transversely disposed front beam and a pair of rearwardly projecting end beams, a roller type cultivator journaled in the outer ends of the end beams, said end beams being swingable about said journal point so that it and the main frame may be positioned either substantially horizontally or substantially vertically, a main draft yoke and an auxiliary draft yoke both connected to the main frame and to each other and both lying in a plane substantially parallel to that of the main frame and end frames, means for connecting the main draft yoke to a tractor when the main and end frames are in substantially horizontal position, and the auxiliary frame being provided with means whereby it may be connected to a tractor when the main and end frames are in substantially vertical position.

THEODORE G. SCHMEISER.

REFERENCES CITED

The following references are of record in the file of this patent:

UNITED STATES PATENTS

| Number | Name | Date |
|---|---|---|
| 324,208 | Alexander | Aug. 11, 1885 |
| 342,995 | Bartmes | June 1, 1886 |
| 614,761 | Rigg | Nov. 22, 1898 |
| 894,346 | Ross | July 28, 1908 |
| 1,073,373 | Trompeter | Sept. 16, 1913 |
| 1,073,650 | Wixcel | Sept. 23, 1913 |
| 1,075,676 | Trompeter | Oct. 14, 1913 |
| 1,304,871 | Garst | May 27, 1919 |
| 1,497,779 | Garst | June 17, 1924 |
| 1,604,567 | Dick | Oct. 26, 1926 |
| 1,617,821 | Ohlsen | Feb. 15, 1927 |
| 1,682,896 | Dunham | Sept. 4, 1928 |
| 2,288,110 | Schmeiser | June 30, 1942 |

FOREIGN PATENTS

| Number | Country | Date |
|---|---|---|
| 250,327 | Great Britain | 1926 |